(12) United States Patent
Sokolov et al.

(10) Patent No.: US 10,379,741 B2
(45) Date of Patent: Aug. 13, 2019

(54) DYNAMIC STORAGE DEVICE REGION PROVISIONING

(71) Applicant: Seagate Technology LLC, Cupertino, CA (US)

(72) Inventors: Daniel J. Sokolov, Boulder, CO (US); Bang C. Nguyen, Superior, CO (US); Andrew M. Kowles, Lyons, CO (US); Cameron S. McGary, Longmont, CO (US); Adam J. Weikal, Butler, PA (US); Brian T. Edgar, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 201 days.

(21) Appl. No.: 14/255,819

(22) Filed: Apr. 17, 2014

(65) Prior Publication Data

US 2015/0301747 A1    Oct. 22, 2015

(51) Int. Cl.
*G06F 12/08* (2016.01)
*G06F 3/06* (2006.01)

(52) U.S. Cl.
CPC ............ *G06F 3/0608* (2013.01); *G06F 3/064* (2013.01); *G06F 3/0673* (2013.01)

(58) Field of Classification Search
CPC ..... G06F 3/0644; G06F 9/5077; G06F 3/0607
See application file for complete search history.

(56) References Cited

U.S. PATENT DOCUMENTS

| | | | | |
|---|---|---|---|---|
| 6,763,446 B1* | 7/2004 | Kemeny | ............... | G06F 3/0617 707/999.202 |
| 8,479,080 B1 | 7/2013 | Shalvi et al. | | |
| 8,650,461 B2 | 2/2014 | Shalvi et al. | | |
| 8,756,382 B1* | 6/2014 | Carlson | ................. | G06F 3/0676 711/103 |
| 2001/0042223 A1* | 11/2001 | Hoskins | ............. | G11B 20/1883 714/6.13 |
| 2005/0044469 A1* | 2/2005 | Nakagawa | ......... | G11B 20/1217 714/769 |
| 2005/0188252 A1* | 8/2005 | Amano | ................. | G06F 3/0625 714/6.3 |
| 2005/0246485 A1* | 11/2005 | Assaf | .................... | G06F 3/0623 711/112 |
| 2007/0168624 A1* | 7/2007 | Kaler | .................... | G06F 3/0608 711/154 |
| 2009/0172468 A1* | 7/2009 | Abali | ................... | G06F 11/2094 714/6.32 |
| 2011/0078364 A1* | 3/2011 | Lee | ..................... | G06F 12/0246 711/103 |
| 2012/0036321 A1* | 2/2012 | Zwisler | ................. | G06F 3/0608 711/114 |
| 2013/0067187 A1* | 3/2013 | Moss | ..................... | G06F 3/0689 711/170 |

(Continued)

*Primary Examiner* — Ryan Bertram
*Assistant Examiner* — Trang K Ta
(74) *Attorney, Agent, or Firm* — Holzer Patel Drennan (57) ABSTRACT

Implementations disclosed herein provide for increasing storage drive performance by reserving a region of user-writeable storage space on a storage medium for overprovisioning uses, including performance-enhancing functions. Until a capacity condition of the storage drive is satisfied, write operations targeting the reserved region are written to another equal-sized region that does not contain user data.

22 Claims, 7 Drawing Sheets

(56) References Cited

U.S. PATENT DOCUMENTS

| | | | |
|---|---|---|---|
| 2013/0261880 A1* | 10/2013 | Cho | G06F 17/00 701/32.4 |
| 2014/0006707 A1* | 1/2014 | Bandic | G06F 12/08 711/113 |
| 2014/0189272 A1* | 7/2014 | Shin | G06F 9/50 711/162 |
| 2014/0281121 A1* | 9/2014 | Karamcheti | G06F 3/061 711/102 |
| 2015/0100740 A1* | 4/2015 | Wang | G06F 12/0888 711/146 |
| 2015/0160882 A1* | 6/2015 | Coker | G06F 3/0626 711/111 |
| 2015/0293719 A1* | 10/2015 | Luo | G06F 3/0619 711/162 |

* cited by examiner

DYNAMIC STORAGE DEVICE REGION PROVISIONING

BACKGROUND

As the requirements for data storage, retrieval, and analysis has increased, the need for cheaper and faster data storage devices has also increased. Data storage devices, such as disc drives, solid state drives, etc., store data on a different recording media using different storage technologies such as magnetic recording, solid state non-volatile memory, etc. Disc drives are widely used as data storage device in computing systems. To meet the increasing demand, disc drives providers can increase the unit capacity of the disc drives by scaling the density of data bits, increasing the number total data bits, and/or increasing the number of storage media in each disc drive. In a competing trend, storage device providers are also under pressure to reduce unit cost of data storage devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In one implementation, the disclosed technology includes a processor configured to direct host-initiated write operations away from one region of user-writeable storage space on a storage medium to reserve the region for performance-enhancing functions until a capacity condition is satisfied.

BRIEF DESCRIPTIONS OF THE DRAWINGS

The described technology is best understood from the following Detailed Description describing various implementations read in connection with the accompanying drawings.

DETAILED DESCRIPTIONS

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As the requirements for data storage, retrieval, and analysis has increased, the need for cheaper and faster data storage devices has also increased. Disc drives are widely used as data storage device computing systems. Such data storage devices include disc drives that store data on magnetic media, optical media, etc. To meet the increasing needs, data storage providers have increased the size of the storage devices as well as the density of the storage devices. Substantially every byte of storage capacity that the storage providers provide to their clients has a cost attached thereto. For example, such cost may be specified in terms of dollars per terabytes, etc. Generally, for disc drive providers and other storage capacity providers, it costs more to produce more storage capacity. However, given the competitive nature of the storage industry, the price that the storage providers can extract from their clients is limited by market forces. Therefore, the storage providers have incentive to reduce the cost of storage as sold to their clients to increase their profit margin and/or to stay competitive.

One of the factors that increases the storage providers' cost per storage capacity or reduces the revenues per storage capacity sold to clients is the overprovisioning of storage capacity where storage providers provide more physical storage capacity than what is sold or reported to their clients. An example of this can be seen when purchasing two different devices from two different manufacturers, both marketed with the same capacity: It can be observed that the devices report slightly different capacities. Overprovisioning, in this context, involves producing and shipping more actual storage capacity than the storage capacity that is sold or marketed to the client or marketplace. Thus, for example, if a storage capacity of 1 TB is sold to a client, the storage provider actually produces ten percent more capacity, thus 1.1 TB of storage capacity is produced in the device. In such a case, while the storage provider is able to get revenue for substantially only 1 TB, it incurs the costs for producing and providing 1.1 TB of storage capacity.

There are a number of reasons for service providers to use overprovisioning. For example, for storage in the form of NAND drives, the overprovisioning ensures that even after the eventual wearing of the storage medium (e.g., as flash cells become unusable), the user-addressable space remains the same. For storage in the form of disc drives, the general term 'overprovisioning' is used for many reasons. The overprovisioning discussed here is used to boost performance metrics, such as average access time, etc., of the disc drives. Disc drive storage providers have incentive to increase the size of the overprovisioning to further increase the performance of the disc drives. However, anytime the amount of overprovisioning is increased, the cost per unit storage capacity also increases. Thus, for a disc drive that is sold as having a 1 TB of storage capacity, if the overprovisioning is increased from 10% to 20%, the cost per TB of storage capacity also increases by 20%, whereas the provider may not be able to recover such cost from the client.

Thus, there is a tradeoff in providing increased overprovisioning between the cost of overprovisioning and the performance benefits obtained by the overprovisioning.

The disclosed technology provides for a thinly overprovisioned, low-cost drive that yields performance benefits associated with a traditionally "thickly" overprovisioned device, costing more to produce the same usable capacity as the thinly overprovisioned device. According to one implementation, this is accomplished via a storage system that reserves a region of user-writeable storage space for functions that mitigate performance degradation due to the loss of advanced disc caching physical resources. Host-initiated writes are directed away from this reserved region until a capacity condition is satisfied.

A capacity condition may be, for example, a condition relating to an amount of data stored on a storage device, a format or work environment of the storage device, or placement distribution of user data on the storage device. When the capacity condition is satisfied, the reserved region is reallocated for storage of user data. For example, the reserved region originally used for performance-enhancing functions may be reallocated for data storage when the drive begins to fill up and data placement options significantly decline.

Figure 1:
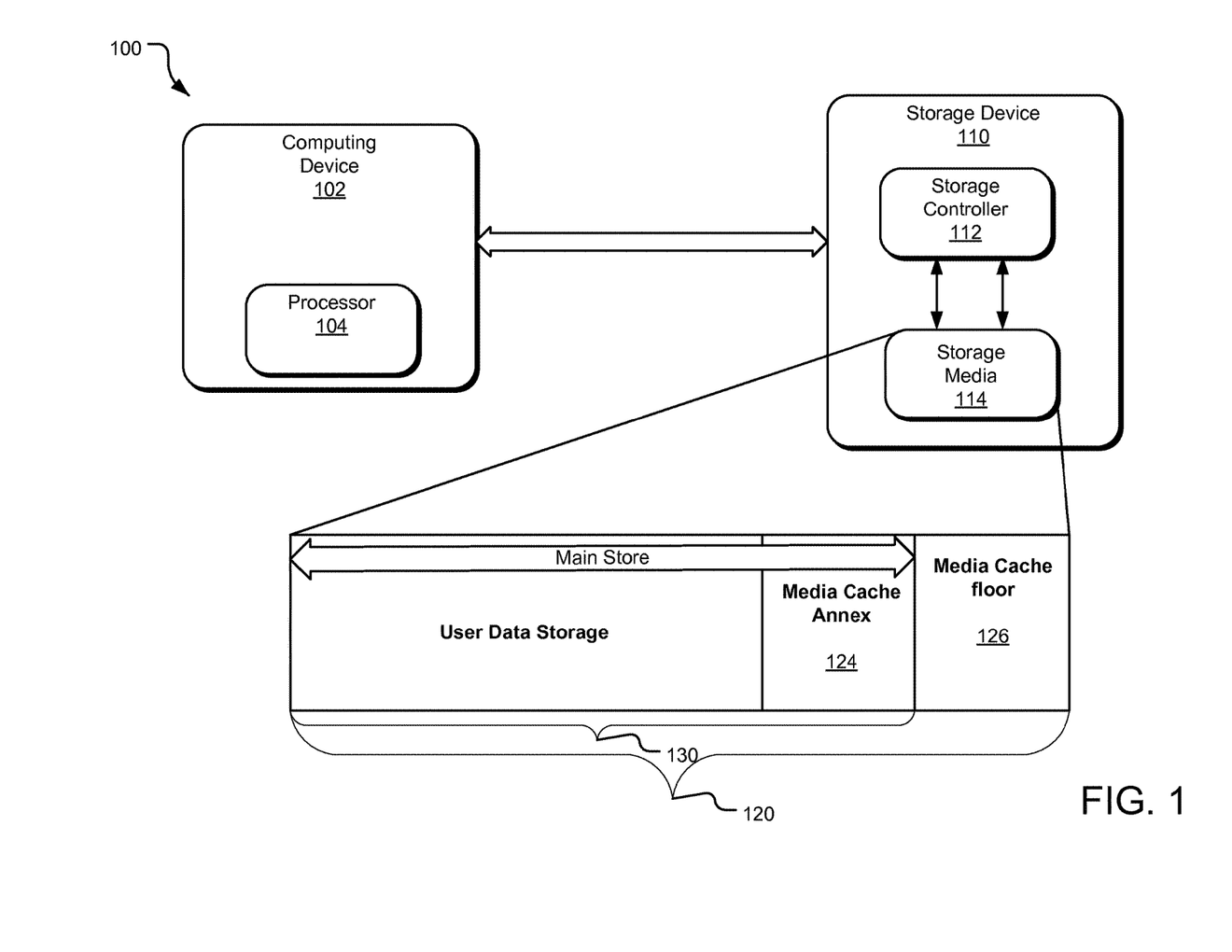
FIG. 1 illustrates an example system for adaptable dynamic storage device overprovisioning of a storage media.

FIG. 1 illustrates a system 100 for adaptable dynamic storage device overprovisioning of a storage media. Specifically, the system 100 includes a computing device 102 having a processor 104 that is communicatively coupled to a storage device 110. While the system 100 is illustrated to have the storage device 110 external to the computing device 102, in an alternative implementation, the storage device 110 may be internal to the computing device 102. The storage device 110 may be, for example, a magnetic disc drive, an optical disc drive, a flash drive, etc. The storage device 110 includes a storage controller 112 and storage media 114. The storage media 114 may be one or more of a variety of tangible computer-readable media (excluding carrier waves and communication signals) including, for example, one or more magnetic storage discs, solid state drives, flash memory optical storage discs, random access memories (RAMs) read only memories (ROMS), and the like.

The storage controller 112 is configured to receive storage commands from the computing device 102 and process the storage commands to read data from the storage media 114, write data to the storage media 114, control movement of a read/write head (if necessary), etc.

The storage media 114 is divided into a number of storage regions. For example, where the storage device 110 is a magnetic disc drive, the storage media 114 is divided into a number of regions, each region made of one or more sectors on the disc drive. An actual capacity 120 of the storage media 114 is equal to the summed capacity of a user-writeable storage space (i.e., a main store 130) and over-provisioning storage space (i.e., a media cache floor 126). In one implementation, both the main store 130 and the media cache floor 126 are statically mapped regions of the storage media 114. In other implementations, one or both of the main store 130 and the media cache floor 126 are dynamically mapped regions of the storage media 114.

In one implementation, the storage controller 112 maintains the division of the storage media 114 into different regions, such as the main store 130 and the media cache floor 126, by keeping an internal mapping of sectors associated with each of the regions. For example, for a disc drive storage device, certain sectors on the discs may be allocated to the main store 130, whereas other sectors of the discs may be allocated to the media cache floor 126.

The main store 130 is storage space generally available for storing user data. In one implementation, the capacity of the main store 130 is equal to that advertised to an end user. For example, a storage drive advertised as a 1 TB drive may have a main store 130 that has 1 TB of useable storage space. In contrast to the main store 130, the media cache floor 126 is a storage space used for performance-enhancing functions. As used herein, the term "performance-enhancing functions" may also refer to, for example, functions that decrease read and write errors, increase performance speed, enhance drive reliability, or reduce power consumption.

The media cache floor 126 is managed by the storage controller 112, such that read and write operations of the media cache floor 126 are initiated by the storage device 110 rather than a host computing device (e.g., the computing device 102). Although the host computing device cannot read or write to the media cache floor 126, the host computing device can initiate read and write operations of the main store 130 by sending a request to the storage controller 112.

The storage controller 112 implements all read and write operations of the storage media 114, including both host-initiated and drive-initiated operations. Accordingly, the storage controller 112 has the ability to filter, redirect, or otherwise alter host-initiated read and write requests without knowledge of the host-computing device.

The main store 130 additionally includes an overlay region, also referred to herein as a "media cache annex 124." Like the media cache floor 126, the media cache annex 124 is also used to provide performance-enhancing functions of the storage device 110. However, as part of the main store 130, the media cache annex 124 can, in some circumstances, serve a dual role of storing user data. In one implementation, the media cache annex 124 is used to supplement performance-enhancing functionality of the media cache floor 126 for a period of time as the main store 130 begins to fill up. When a capacity condition of the main store is satisfied, storage space in the media cache annex 124 can be reallocated for user data storage.

The performance-enhancing functions provided by the annex are made possible by the fact that the user may not be using all of the advertised capacity of the storage media 114. Without the performance-enhancing functions provided by the media cache annex 124, a performance loss can be observed, such as decreased speed, reliability, increased errors, increased power consumption, etc.

In FIG. 1, the media cache annex 124 is shown at an end of the main store 130, adjacent to the media cache floor 126; however, it should be understood that the media cache annex 124 can be located anywhere within the main store 130, including both contiguous and non-contiguous groupings of data blocks (e.g., sectors).

In one implementation, the media cache annex 124 is statically assigned to particular data blocks in the main store 130. For example, the location of the media cache annex 124 may be statically assigned by a user during initialization of the storage device 110 or during a factory formatting process. In other implementations, the media cache annex 124 is dynamically assigned.

If the media cache annex 124 is statically assigned, performance challenges can arise when a user attempts to write data to a storage location included within the media cache annex 124. For example, a host-initiated data write to the media cache annex 124 may halt execution of the performance-enhancing functions provided by the media cache annex 124.

To address these challenges, the technology disclosed herein provides a mechanism for re-directing host-initiated data writes away from the media cache annex 124 for a period of time until a capacity condition is satisfied. During this time, the media cache annex 124 is used for performance-enhancing functions. Once the capacity condition is satisfied, the storage controller 112 may allow user data to be stored in the media cache annex 124 at the expense of some or all of the performance-enhancing functions provided by the media cache annex 124. In this sense, the media cache annex 124 can be used for performance-enhancing functions until it is needed for user storage, such as when there are few or no remaining user data placement options.

A variety of performance factors may affect positioning of the media cache annex 124. When the storage device 110 is a disc, short seek times are associated with positions that are midway between an inner diameter (ID) and an outer diameter (OD) of the disc. Therefore, it may be useful to include the media cache annex 124 on one or more data tracks midway between ID and OD in order to reduce read/write times of data in the media cache annex 124. Another consideration affecting the placement of the media cache annex 124 is data rate. Because a high data rate is associated with positions near the OD of a disc, there may be other performance-related advantages attained when media cache annex 124 is located near the OD of the disc.

In one implementation, the media cache annex 124 is a contiguous number of data blocks. For example, it may be possible to write to all data blocks in the media cache annex 124 without performing an interim seek operation of a write element. In another implementation, the media cache annex 124 includes two or more non-contiguous data blocks. In this system, writing data to the entire media cache annex 124 entails at least one interim seek operation to lift and reposition a write element.

Figure 2:
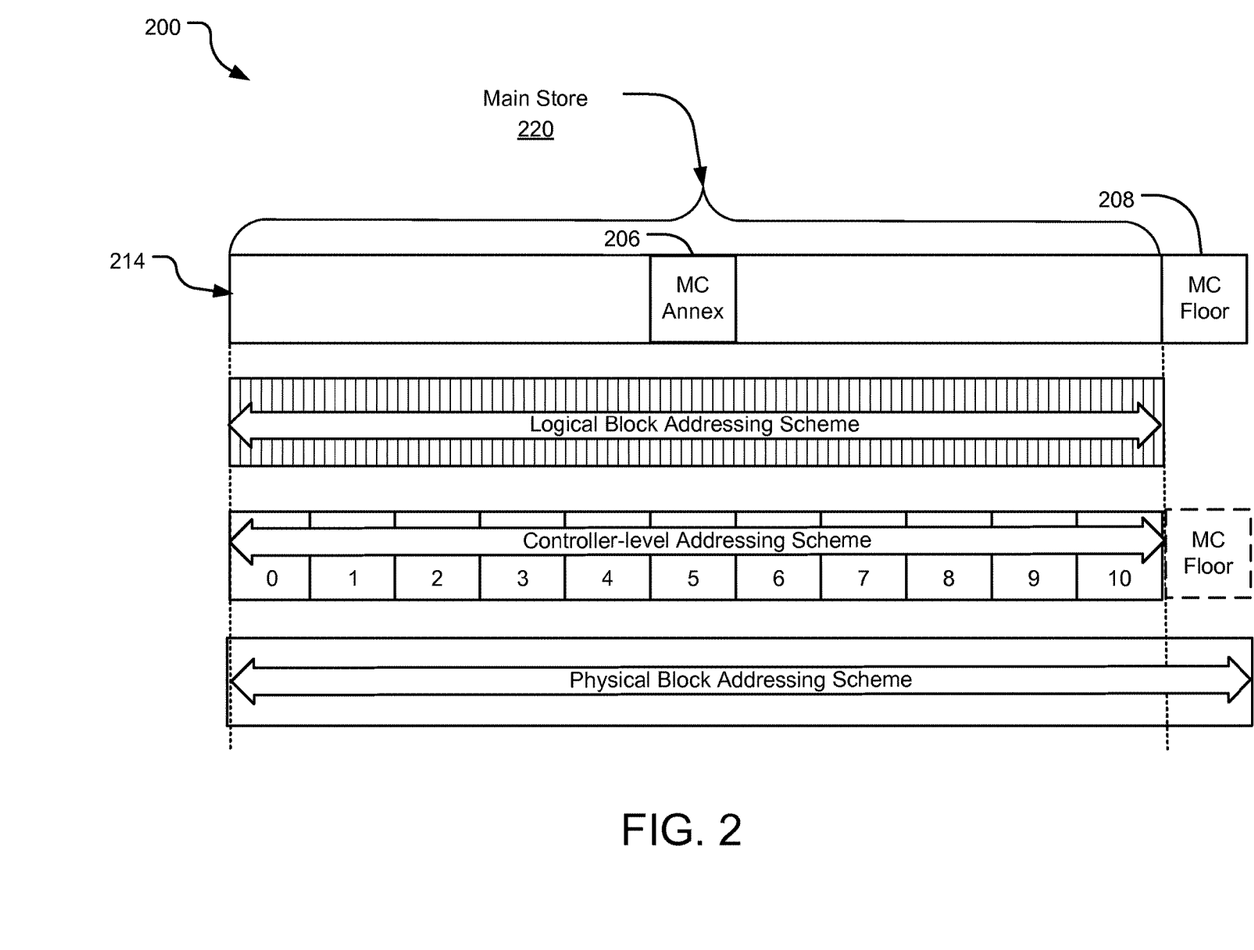
FIG. 2 illustrates another example system for adaptable dynamic storage device overprovisioning of a storage media.

FIG. 2 illustrates a system 200 for adaptable dynamic storage device overprovisioning of a storage media 214. The storage media 214 includes storage space divided into a number of different regions corresponding to associated data blocks (e.g., sectors and/or tracks) tracked by a controller (not shown) of a storage device.

The storage media 214 includes a media cache floor 208 allocated for performance-enhancing functions and also includes a main store 220 having a number of data blocks generally available for storage of user data. The main store 220 further includes a media cache annex 206, which is a reserved area of storage that can be used to supplement the performance-enhancing functionality provided by the media cache floor 208. As part of the main store 220, the media cache annex 206 can also, in some circumstances, be used to store user data.

Each of the usable data blocks in the main store 220 is assigned a logical block address (LBA). When writing user data to the storage media 214, a host computer uses the LBA addressing system to direct data writes to particular locations on the storage media 214. As illustrated in FIG. 2, the media cache floor 208 is excluded from the logical block addressing scheme. Accordingly, a host computer is unable to direct the storage controller to write user data to the media cache floor 208.

The controller of the storage device uses another addressing scheme, different from the logical block addressing scheme, to track locations in the main store 220. The controller-level addressing scheme divides the storage space in the main store 220 into equal sized regions, with each region equal in size to the size of the media cache annex 206. In one implementation, the media cache annex 206 has a storage capacity that is an integer multiple of the storage capacity of the media cache floor 208. For example, the media cache floor 208 may have a capacity of 0.1 TB when the media cache annex 206 has a capacity of 0.2 TB. In other implementations, the media cache annex 206 has an equal or decreased storage capacity when compared to the media cache floor 208.

In the event that the main store 220 does not equally divide into regions of the select size, one of the resulting regions may be of an irregular size that is smaller or larger than the other regions. Redirecting operations (described below) may exclude the irregularly sized region from the dynamic remapping processes.

In FIG. 2, the controller uses an address numbering scheme 0-10 to identify regions on the storage media 214. In one implementation, the regions 0-10 are equal in size. Although the media cache annex 206 may be included anywhere within the main store 220, the media cache annex 206 of FIG. 2 is in region 5 of the controller-level addressing scheme.

Using the controller-level addressing scheme, the controller redirects host-initiated write operations away from media cache annex 206 for a period of time as the main store 220 begins to fill up. For example, an host initiated write command directed at an LBA corresponding to the media cache annex (e.g., region 5) may be redirected to another user-writable region (e.g., 0-4 or 6-10).

In one implementation, a host-initiated write command targeting physical data blocks in region 5 is redirected to an empty region. For example, the controller may redirect a write operation from region 5 to region 4 by updating a mapping table to indicate that the range of LBAs originally associated with physical data blocks in region 5 are reassigned to physical data blocks in region 4. As a result, region 4 is used for storage of data that the host device originally designated for storage in region 5. If, in the above example, the controller receives another, subsequent write command directed to an LBA range originally associated with region 4, the controller may elect to direct the write command to another empty region because region 4 already includes user data previously associated with region 5.

In this way, the media cache annex 206 can continue to serve performance enhancing functions for an extended period of time determined by the storage device controller, rather than the user or host writing data to the main store 220.

In one implementation, the controller reallocates the media cache annex 206 for user data storage when a capacity condition is satisfied. A capacity condition may be satisfied when, for example, a total disc capacity reaches a predetermined threshold, a set velocity of storage consumption is detected, or a number of remaining unused regions hits a predetermined threshold. Other metrics are also contemplated. This reallocation allows the user to utilize the full, advertised capacity of the storage device.

Figure 3:
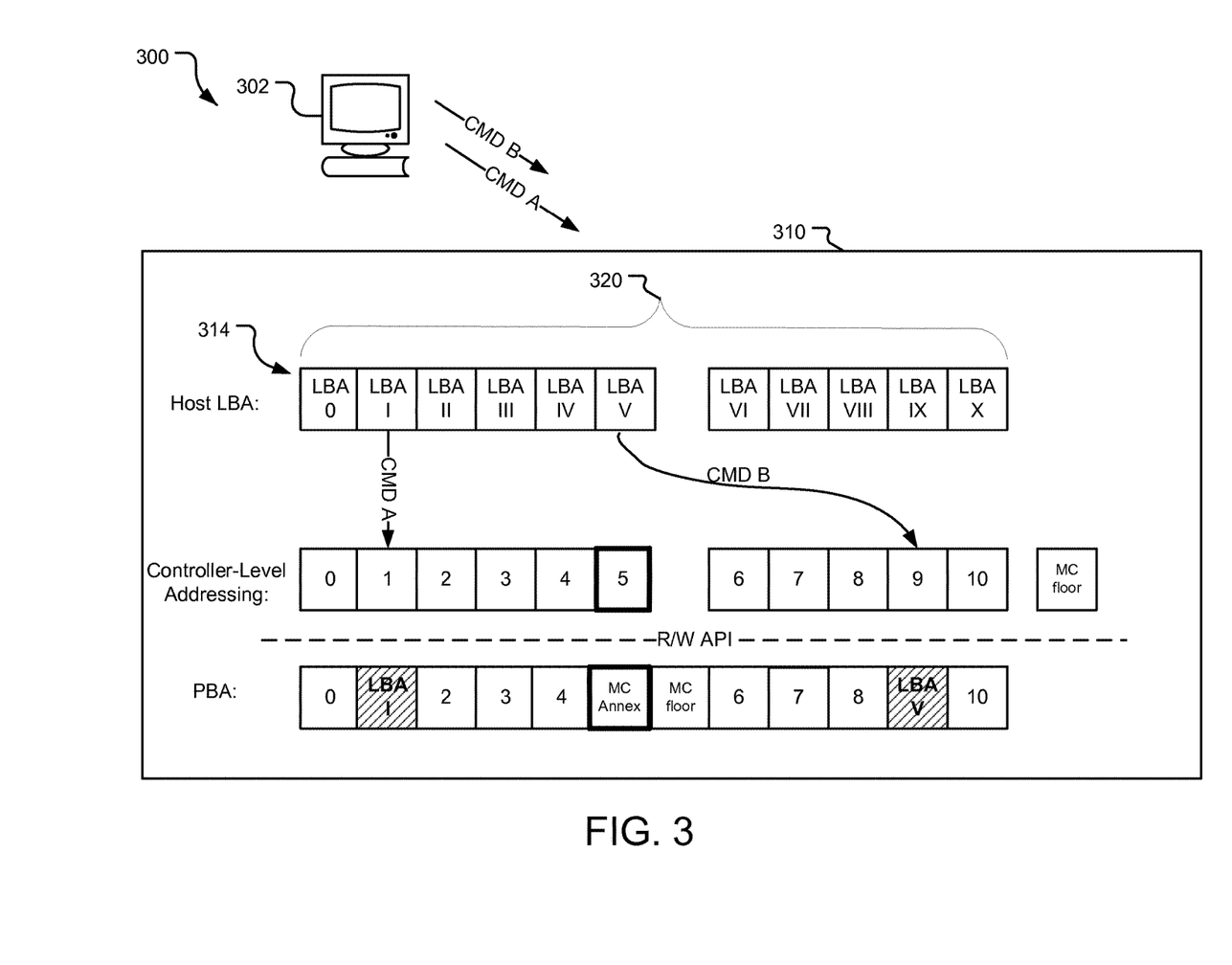
FIG. 3 illustrates execution of write commands in an example system for adaptable dynamic storage device overprovisioning.
Figure 4:
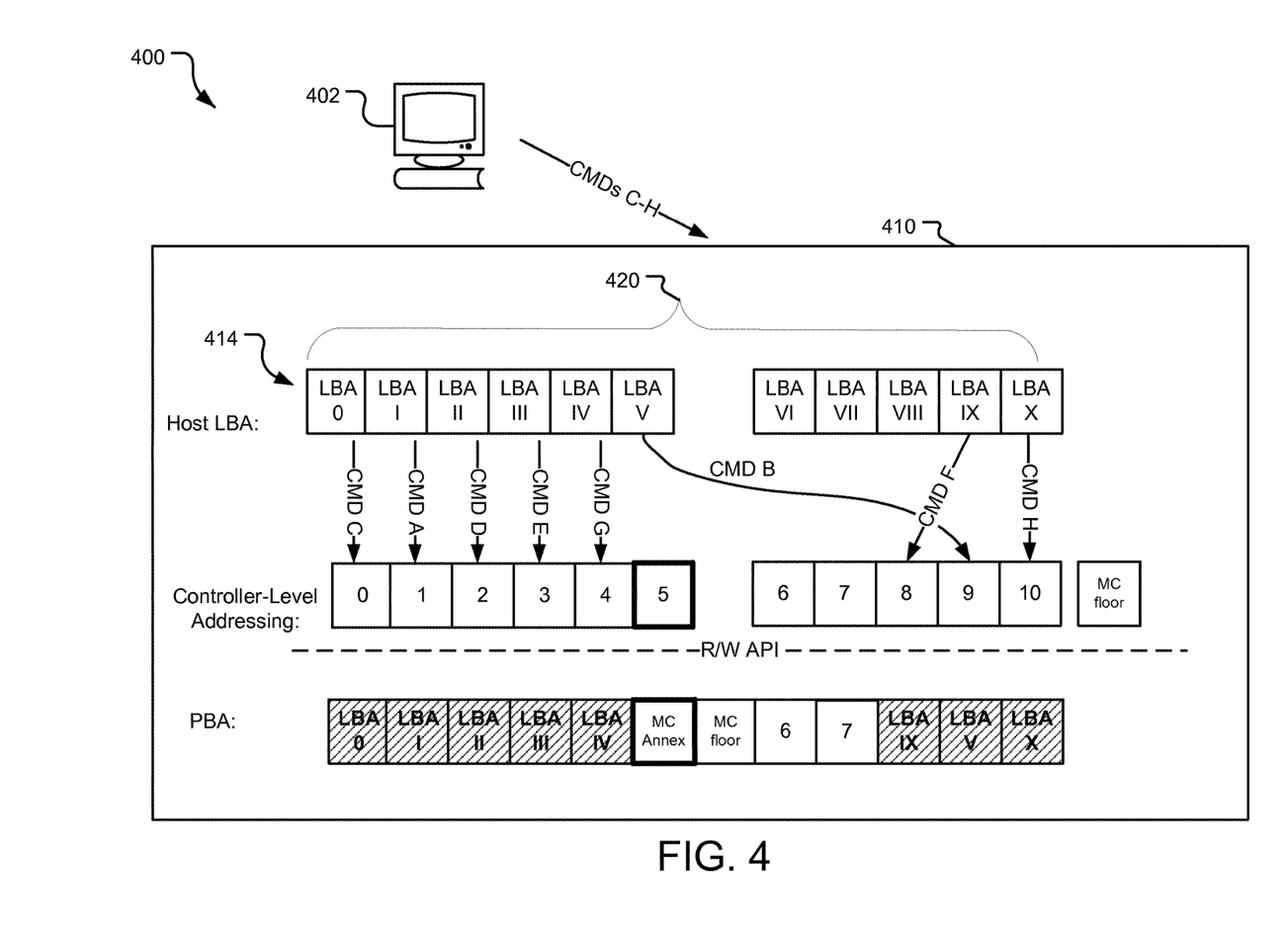
FIG. 4 illustrates execution of write commands in an example system for adaptable dynamic storage device overprovisioning.
Figure 5:
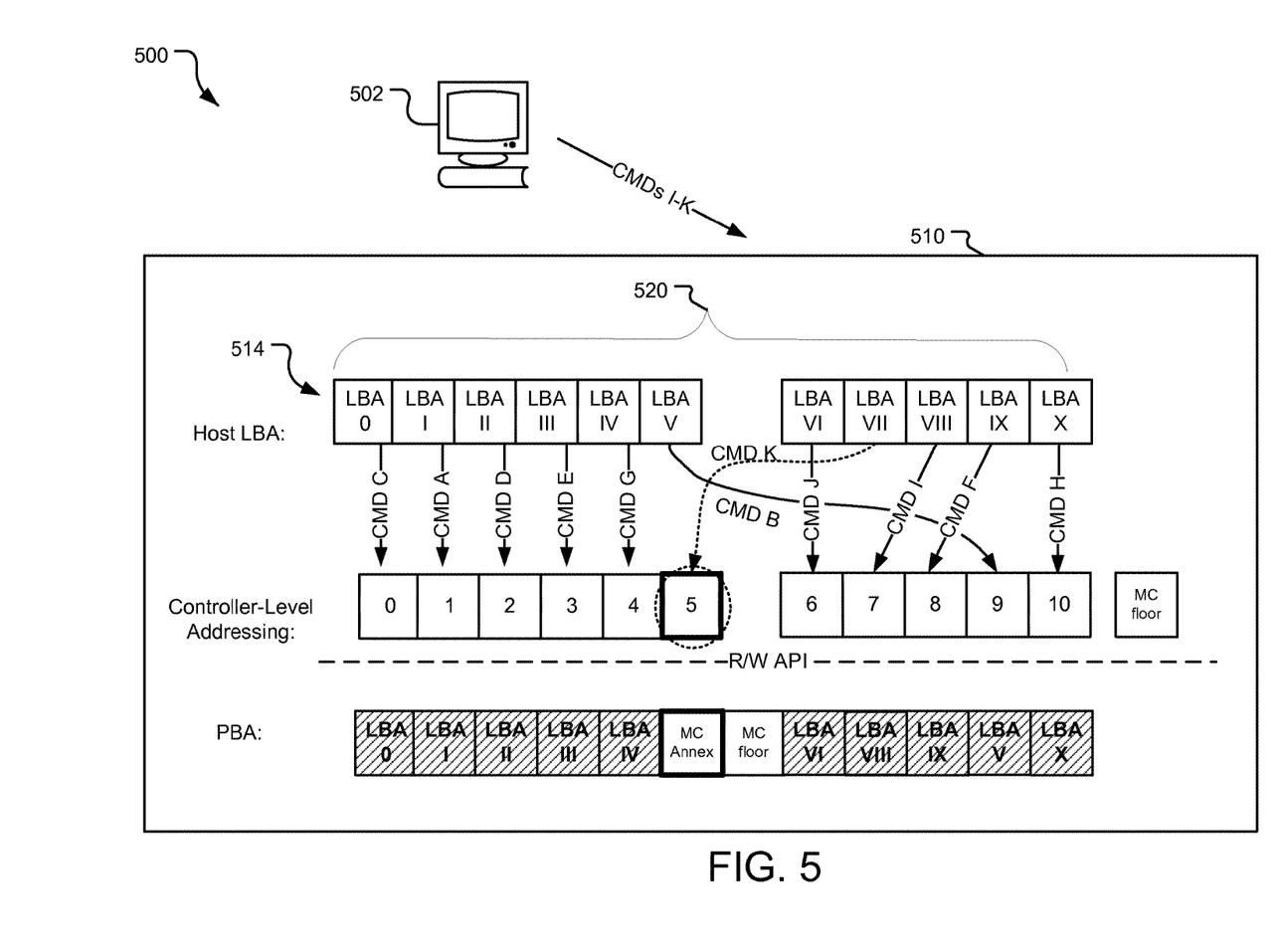
FIG. 5 illustrates execution of write commands in an example system for adaptable dynamic storage device overprovisioning.

FIGS. 3-5 illustrate execution of a write command sequence and dynamic remapping in an example system for adaptable dynamic storage device overprovisioning. FIG. 3 illustrates execution of write commands (e.g., CMD A and CMD B) in an example system 300 including a storage device 310 with a storage media 314 divided into a number of equal sized regions (regions 0-10). The regions 0-10 (shown in a middle tier of FIG. 3) correspond to an addressing scheme of the storage device that is managed by a controller of the storage device 310 without communication to a host computer 302. The middle tier of FIG. 3 also includes a media cache floor (i.e., the MC floor). The MC floor is a storage region that is statically mapped and allocated for performance-enhancing use. Because the MC floor is not designated for storage of user data, the MC floor is not accessible by a host computer 302. However, it is writeable to by the controller of the storage device 310.

An upper tier of FIG. 3 shows how each of the regions 0-10 corresponds to logical block addresses (LBA) used by a host computer. For example, "LBA 0" indicates a range of LBAs mapping to physical data blocks in region '0' of the controller-level address scheme. Likewise, "LBA I" indicates a range of LBAs mapping to physical data blocks in region '1' of the controller-level address scheme. Other LBA regions II through X similarly correspond to physical data blocks in an associated region of the controller-level address scheme.

Each of the useable physical data blocks on the storage media 314 is assigned a physical block address (PBA). A bottom tier of FIG. 3 indicates how the PBAs on the storage media 314 correspond to the regions of the controller-level addressing scheme. In addition, the hatching (e.g., shading) in select regions of the bottom tier (e.g., regions 1 and 9) indicates how the PBAs map to LBAs of a host computing device after remapping via a dynamic remapping scheme.

The PBA scheme of the storage device 310 includes the media cache floor, which does not map to an existing region in the controller-level addressing scheme or to an LBA range of the host computer 302.

Data blocks included in the controller-level addressing scheme (e.g., the regions numbered 0-10) form a main store 320 of the storage media 314 that is designated for storage of user data. Unlike the MC floor, regions 0-10 include physical data blocks that are assigned logical block addresses under the LBA scheme used by the host computer 302. Therefore, the host computer 302 may read and write to usable data blocks within regions 0-10 on the storage media 314.

Region 5 of the main store 320 is a user-writable storage region that is allocated for performance-enhancing use unless a capacity condition of the storage media 314 is satisfied. This region is also referred to herein as a media cache annex (i.e., the MC annex). If the capacity condition of the storage media 314 is satisfied, region 5 is used for storage of user data.

In other implementations, the MC annex includes more than one region of the controller-level addressing scheme. The regions of the MC annex are each reserved for performance-enhancing functions until one or more capacity conditions are satisfied. For example, regions 2, 5, and 7 may collectively form the MC annex. These regions can each be separately re-allocated for storage of user data (e.g., as needed) when different capacity conditions are met. This allows for discrete and gradual conversion of each of these regions for client use (e.g., user data storage).

In FIG. 3, the host computer 302 sends two write commands, CMD A and CMD B to the storage device 310. Each of the write commands includes a target LBA and data length, indicating a target LBA range that corresponds to physical data blocks within the main store 320. Prior to receipt of either of the two write commands, storage media 314 does not include any user data.

Upon receipt of CMD A, the controller accesses a file (e.g., a table, log file etc.) to determine which physical data blocks on the storage device correspond to the target LBA range of CMD A. The controller determines that the target LBA range corresponds to a range of physical data blocks within region 1 of the controller-level addressing scheme. Because region 1 is available and does not yet include user data, the storage device 310 executes the write operation on the physical data blocks within region 1. In the illustrated implementation, this first write to region 1 effectively "locks in" PBAs in region 1 (indicated by hatching in region 1 in the bottom tier) so that the LBA range associated with PBAs in region 1 as corresponding to LBAs in the range LBA I. Because region 1 is "locked in," it is not dynamically remapped at a later point in time.

Upon receipt of a second write command (CMD B), the controller again accesses a file to determine which physical data blocks on the storage device correspond to the target LBA range of CMD B. The controller determines that the target LBA range of CMD B corresponds to a range of physical data blocks within region 5 of the controller-level addressing scheme. Because region 5 is the media cache annex, the storage device 310 redirects the write command away from physical data blocks in region 5 and to another region in the main store 320 that does not yet contain any user data. In FIG. 3, the write command to region 5 is redirected to another available region, region 9. Selection criteria used in selecting an available region (e.g., region 9) may vary in different implementations To allow for the above-described redirection of CMD B away from the MC annex (i.e., region 5), the controller dynamically remaps the range LBA V. Originally, the range LBA V is associated with PBAs in region 5 of the controller-level addressing scheme. After a dynamic remapping process, the range LBA V is associated with PBAs in region 9 of the controller-level addressing scheme. In one implementation, the entire LBA range associated with region 5 is remapped to the PBAs in region 9. This is made possible in part by the fact that region 5 and 9 can be made to be identical in size. In addition, the controller may use data validity protection in region 9 based on LBAs originally associated with region 5.

After the write, the PBAs in the region originally numbered '9 ' in the controller-level addressing scheme are effectively "locked in" as now corresponding to logical block addresses in the range LBA V. As a result, the range LBA V is not remapped at a later time.

In one implementation, the controller of the storage device 310 is firmware and/or hardware. The controller tracks and manages the dynamic remapping of the storage media 314 by updating one or more files (e.g., tables, log files, etc.) stored on the storage media 314 or other non-volatile memory accessible by the controller. Other implementations are also contemplated.

FIG. 4 illustrates execution of additional write commands (e.g., CMDs C-H) in an example system 400 for adaptable dynamic storage device overprovisioning. The example system 400 includes a storage device 410 with user-writeable storage space (e.g., a main store 420) of a storage media 414 divided into a number of equal sized regions (regions 0-10). In one implementation, the regions correspond to an addressing scheme of the storage device that is managed by a controller of the storage device 410 without communication to a host computer 402.

Prior to receipt of the write commands CMDs C-H, CMDs A and B have been executed (e.g., as described above with respect to FIG. 3).

Upon receipt of each of CMDs C, D, and E, the controller accesses a file to determine which range of physical data blocks on the storage device correspond to the target LBA range associated with each command. The controller determines that CMDs C, D, and E target LBAs originally corresponding to PBAs in each of regions 0, 2, and 3, respectfully. Because each of regions 0, 2, and 3 are unused (and thus not yet "locked-in") regions, the controller permits CMDs C, D, and E to execute on the target range of PBAs in each of regions 0, 2, and 3, respectively. After the writes to regions 0, 2, and 3, LBA ranges originally associated with each of regions 0, 2, and 3 (e.g., LBA 0, LBA II, and LBA III) are effectively "locked in" so that the LBA ranges are not remapped at a later time.

Upon receipt of CMD F, the controller again accesses a file to determine which physical data blocks on the storage device correspond to the target LBA range of CMD F. The controller determines that CMD F targets LBAs corresponding to PBAs in region 9. Because region 9 already includes user data (e.g., data associated with the range LBA V), the storage device 410 redirects the write operation away from region 9 and over to region 8, which does not yet contain any user data.

To allow for this redirection, the controller dynamically updates a mapping file to remap the range LBA IX. Originally, the range LBA IX is associated with PBAs in region 9 of the controller-level addressing scheme. After a dynamic remapping process, the range LBA IX is associated with PBAs in region 8 of the controller-level addressing scheme. In addition, the controller may use data validity protection in region 8 based on LBAs originally associated with region 9. After the write to region 8, the PBAs in region 8 are effectively "locked in" as now corresponding to logical block addresses in the range LBA IX. The range LBA IX is not remapped at a later time.

After executing CMD F, the storage device 410 also receives commands G and H. The controller determines that CMDs G and H target LBAs in the ranges of LBA IV and LBA X, respectively. Ranges LBA IV and LBA X are associated with physical data blocks in regions 4 and 10 of the controller-level addressing scheme. Because each of regions 4 and 10 of the controller-level address scheme are unused regions, the controller permits CMDs G and H to execute on the target range of PBAs without remapping. After the execution of CMDs G and H, PBAs in each of regions 4 and 10 are effectively "locked in" as corresponding to the logical block addresses in the ranges LBA IV and LBA X.

FIG. 5 illustrates execution of additional write commands (e.g., CMD I and CMD J) in an example system 500 for adaptable dynamic storage device overprovisioning. In FIG. 5, the host computer 502 sends a series of write commands (e.g., CMDs I, J, K, in alphabetical order) to the storage device 510. Prior to receipt of any of CMDs I-K, CMDs A-H have been executed (e.g., as described with respect to FIGS. 3 and 4). Upon receipt of CMD I, a controller of the storage device accesses a file to determine which physical data blocks on the storage device correspond to the target LBA range of CMD I. The controller determines that CMD I targets an LBA range associated with physical data blocks in region 8 of the controller-level addressing scheme. Because region 8 of the controller-level addressing scheme already includes user data (e.g., has already been "locked in" by the remapping of the range LBA IX), the storage device 510 redirects the write operation away from physical data blocks in region 8 and over to physical data blocks in region 7, which does not yet contain any user data.

To allow for this redirection, the controller dynamically updates a mapping file to remap the range LBA VIII. The range VIII was originally associated with PBAs in region 8, but is remapped to be associated with PBAs in region 7. In addition, the controller may use data validity protection in region 7 based on LBAs originally associated with region 8. The write command is executed in region 7, and the PBAs in region 7 are effectively "locked in" as now corresponding to LBAs in the range LBA VIII. The range LBA VIII is not remapped at a later time.

After executing CMD I, the storage device receives CMD J. The controller determines that CMD J targets an LBA range associated with physical data blocks in region 6 of the controller-level addressing scheme. Because region 6 is still an unused region, the controller permits CMD J to execute without remapping. After the writes to region 6, the PBAs in region 6 are effectively "locked in" as now corresponding to LBAs in the range of LBA VI.

After executing CMD J, the controller determines that a capacity condition is satisfied because the only remaining unused region is the media cache annex (region 5). Accordingly, the controller takes action to reallocate the media cache annex for user data storage, rather than performance-enhancing uses. Reallocation of the media cache annex for user data storage may include, for example, migrating data out of the media cache annex and either to the main store 520 via a cleaning process or over the media cache floor to create space in the media cache annex for new user data.

In at least one implementation, the capacity condition is satisfied by satisfaction of one or more criteria different than those described above. For example, a capacity condition may be satisfied when some but less than all regions of the media 514 include user data except for those region(s) in the media cache annex. Alternatively, a capacity condition may be satisfied when the controller detects a predetermined 'velocity of storage consumption' as the media 514 begins to fill up. In these and other implementations, the controller can initiate cleaning and/or data reallocation processes of the media cache annex at a time either at or before the media cache annex is the sole remaining available region. For example, the controller may adaptively determine an appropriate time to start migrating data out of the media cache annex based on the detected velocity of storage consumption at some time before write command K is received.

After performing one or more data reallocation and cleaning processes of the MC annex, the storage device receives another write command, CMD K. The controller determines that CMD K targets an LBA range associated with physical data blocks in region 7. Because region 7 of the controller-level addressing scheme already includes user data (e.g., has already been "locked in" by the remapping of the range LBA VIII), the CMD K cannot be written to region 7. In this case, the only remaining, un-locked (e.g., unused, available) region on the storage media is region 5, the MC annex, which has been cleaned out and can now receive user data.

Although not shown in FIG. 5, the controller responds to the receipt of CMD K by redirecting the associated write operation away from region 7 and over to region 5 (indicated by dotted arrow). To allow for this redirection, the controller dynamically updates a mapping file to remap the range LBA VII. The range LBA VII was originally associated with PBAs in region 7 of the controller-level addressing scheme. After the remapping, LBA VII is associated with PBAs in region 5. In addition, the controller may use data validity protection in region 5 based on LBAs originally associated with region 7. The controller executes the write command in region 5, locking in the range LBA VII as corresponding to PBAs in region 5. Mapping of the storage media 514 is complete.

Figure 6:
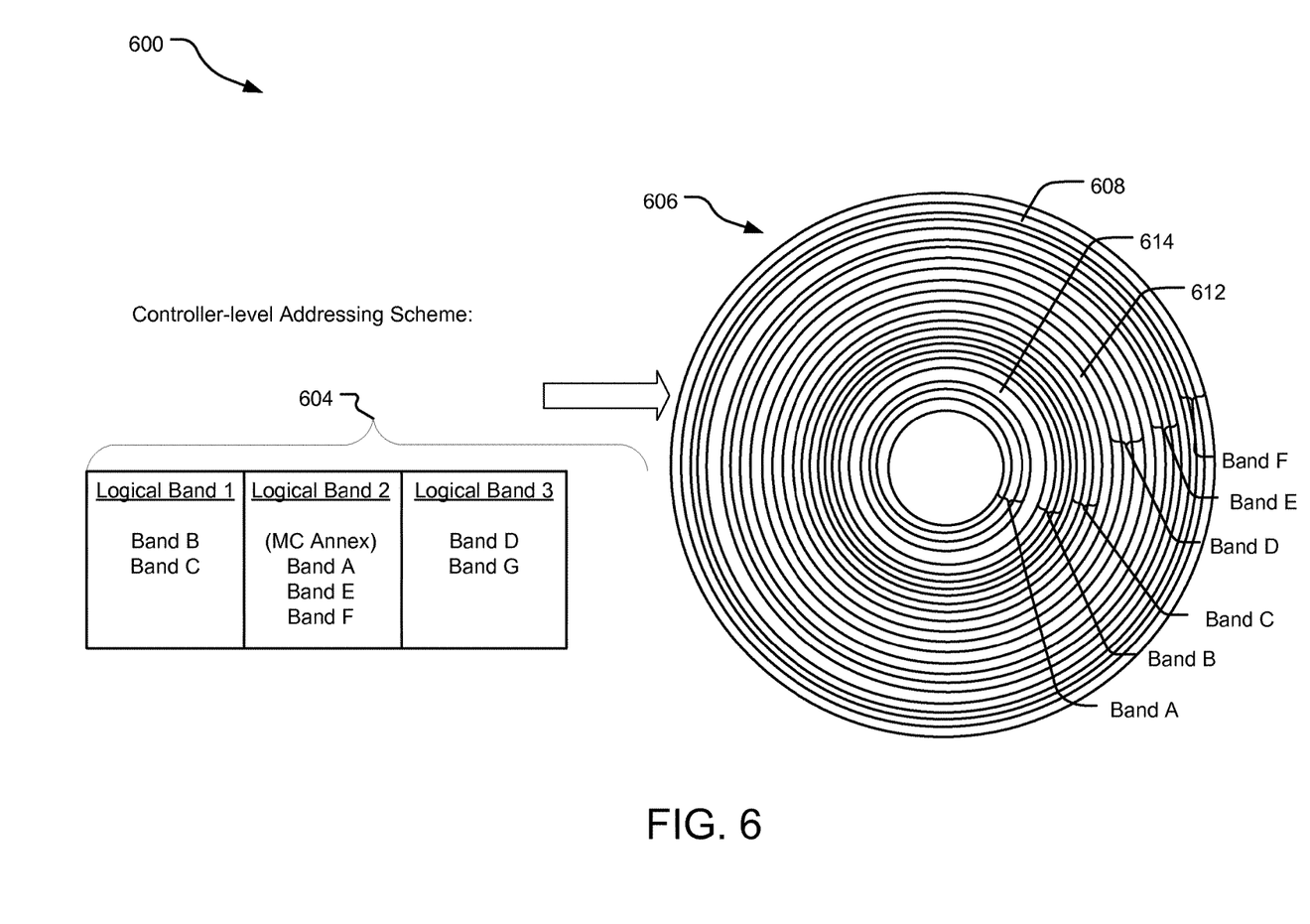
FIG. 6 illustrates another example system for adaptable dynamic storage device overprovisioning of a storage media.

FIG. 6 illustrates another example system 600 for adaptable dynamic storage device overprovisioning of a storage media 606. The storage media 606 is a shingled magnetic storage media including a number of concentric tracks (e.g., a track 608) that each includes a plurality of data regions or cells on which data can be stored. Isolation regions (e.g., isolation regions 612 and 614) separate groupings of adjacent data tracks, referred to as "data bands" (e.g., physical data bands A, B, C, D, E, and F). Data may be stored within each of the data bands. No data is stored in the isolation regions. In one example implementation, the storage media 606 includes 4000 data bands per TB of storage, with each data band holding 256 MB. Other implementations are also contemplated. To simplify illustration, six physical data bands (e.g., Bands A-F) are shown. One example implementation may include significantly more (e.g., thousands more) than six data bands.

In the system 600, a controller of the storage device tracks regions on the media using a controller-level addressing scheme 604 shown to include a number of logical bands. The logical bands are each associated with a number of consecutive or non-consecutive LBA ranges of a host computer. However, the logical bands (e.g., host LBA ranges) may be dynamically assigned to physical data bands on the storage media 606. In one implementation, the logical bands are not necessarily associated with physical data bands until either (1) an LBA range is substantially written for the first time; or (2) a logical band is "cleaned out," meaning that some data for the logical band is aggregated and then written to a newly associated physical data band.

In operation, the storage controller directs write operations away from a "reserved" set of physical data bands (e.g., a media cache annex) for a period of time until a capacity condition is satisfied. Storage space of the reserved physical data bands is initially utilized for performance-enhancing functions, but may be subsequently reallocated for storage of user data. In the implementation illustrated, Band A, Band E, and Band F are "reserved" physical data bands forming a media cache annex. So long as there is sufficient available space in non-reserved physical data bands, the controller dynamically assigns LBA of each incoming, host-initiated write operation to physical data blocks in one or more of the physical data bands that is not "reserved" as part of the media cache annex.

As the storage media 606 begins to "fill up" (e.g., allocating a number of physical data bands to host LBA), the number of logical data bands including sufficient space to accommodate an incoming write operation decreases such that execution of the write operation entails either (1) freeing up additional space, such as by aggregating and moving data between data bands; or (2) reallocating physical data bands of the media cache annex for storage of user data. When one of the conditions (1) and (2) is met, a "capacity condition" is satisfied, triggering a cleaning or re-allocation action initiated by the controller.

It should be understood that a cleaning or reallocation action of the controller may be triggered by capacity conditions different from those described above, including those described elsewhere herein.

In FIG. 6, the controller can elect to separately clean and/or reallocate each physical data band in the media cache annex. For example, a capacity condition may trigger a cleaning and reallocation of Band A, but leave Band E and Band F untouched. This allows for discrete and gradual conversion of each of the reserved physical data bands. Once physical data bands in the media cache annex are cleaned out, they can be used for storage of user data In a shingled magnetic recording system, moving of data can be a time consuming process because entire data bands are moved at once. Therefore, the capacity condition in the system 600 may be set at a predetermined threshold that provides ample time for clearing out one or more physical data bands of the media cache annex before such physical data bands are needed to be reallocated for user storage. For example, the capacity condition may trigger a clean-out of the media cache annex when the total number of unused logical bands is still greater than one (e.g., when two or three unused physical bands remain). In some implementations, a capacity condition may trigger a partial clean-out of the media cache annex, such as a clean-out of one or more (but less than all) physical bands in the media cache annex.

In the shingled magnetic recording system of FIG. 6, decimation techniques can be used to break the "reserved" data bands of the media cache annex into even smaller, individually rewriteable and allocable units of storage referred to herein as "granules." A granule is, for example, a group of sectors that can be accessed at once without necessitating a seek operation. A seek operation is an operation that radially moves an actuator arm in a storage device by a degree that is different than in an ordinary track switch between consecutively-read adjacent data tracks.

In one implementation, granules of the media cache annex are of a fixed logical size (e.g., 1 MB). If a granule has at least as many sectors as a data track, then the granule is guaranteed to cover at least an entire data track, given that considerations such as defects can increase the physical size of the granule. Some granules in the media cache annex are intentionally decimated (e.g., left blank and unused) by the controller in order to isolate used granules from one another. For example, when the granule size is an individual data track, every other data track in the media cache annex may be unused in order to isolate used tracks from one another. In other implementations, the granule size is larger than a data track but smaller than a data band. By leaving some granules blank, other used granules are isolated from one another. Isolation of granules via such decimation techniques allows granules to be allocated and used in storage media (such as shingled storage media) that otherwise does not trivially support individually rewriteable granules.

In implementations where the storage media 606 is randomly accessible, granules may be used without decimation. In more constrained media (such as shingled media), the same granule allocation mechanism can be used as long as some granules are excluded from the pool of available granules. In contrast, schemes such as track-level decimation and dynamic changes to the track pitch carry address translation requirements that can be significantly more complex in implementation.

Figure 7:
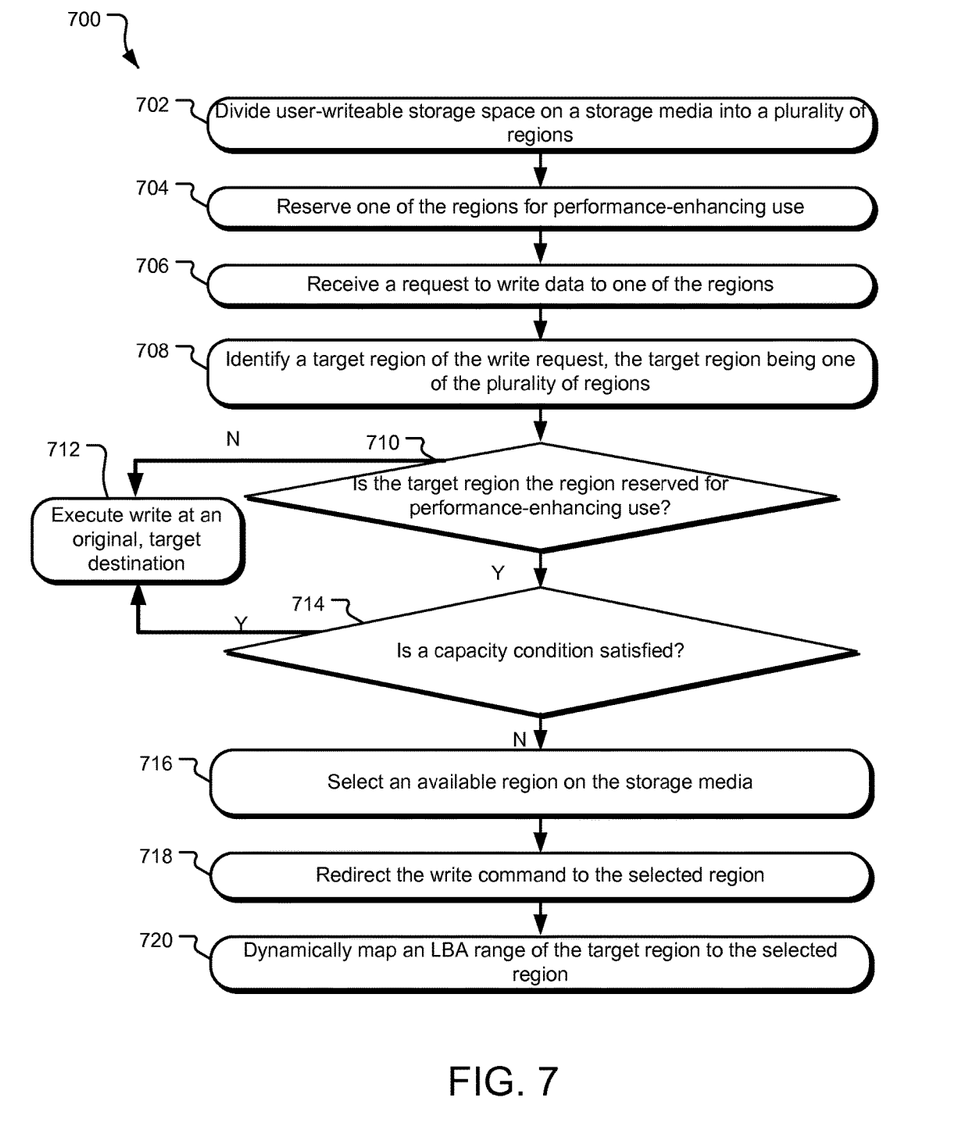
FIG. 7 illustrates example operations for managing a write operation in a system for adaptable dynamic storage device overprovisioning.

FIG. 7 illustrates example operations for managing a write operation in a system for adaptable dynamic storage device overprovisioning. The system includes a storage media with usable space allocated between a main store and a media cache floor. The main store is a region writeable to by a host computer, and thus allocated for storage of user data. The media cache floor is mapped and allocated for performance-enhancing uses in the system. This mapping could be either static or dynamic.

A division operation 702 divides the main store (e.g., the user-writable storage space) on the storage media into a plurality of regions. In at least one implementation, the regions are of equal size. If the storage space does not evenly divide into regions the size of the media cache floor, one storage region may be smaller or larger than the others.

The regions created by the division operation 702 each include a number of physical data blocks associated with various LBA ranges known to a host device. In one implementation, the regions are organized and managed by the controller of the storage device.

A reserving operation 704 reserves one of the regions created by the division operation 702 for performance-enhancing functions. A receiving operation 706 receives a write request including data of a set length and an LBA start point for executing the command. An identification operation 708 identifies a target region on the storage media including physical data blocks associated with the LBA range specified in the write command. The target region is one of the plurality of regions created by the division operation 702.

A determination operation 710 determines whether the target region identified by the identification operation 708 is the region reserved for performance-enhancing use. If the identified target region is not the region reserved for performance-enhancing use, an execution operation 712 executes the write command, beginning at the specified LBA start point. If the identified region is the region reserved for performance-enhancing use, another determination operation 714 determines whether a capacity condition has been satisfied.

In one implementation, the capacity condition is unsatisfied so long as at least one of the user-writeable regions is unused and available for the write operation. If the capacity condition is not satisfied, a selection operation 716 selects one of the unused user-writable regions. A redirection operation 718 then redirects the write command to the user-writeable region selected by the selection operation 716, where the write command is executed. In one implementation, data validity protection is used in the selected user-writable region based on LBAs originally associated with the original, target region (i.e., the original target region of the write command). A dynamic mapping operation 720 re-maps an LBA range of the original, target region of the write command to the region selected by the selection operation 716.

If the determination operation 714 determines that the capacity condition is satisfied, the execution operation 712 executes the write command, beginning at the specified LBA start point.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A storage device comprising:
a processor configured to:
reserve a region of user-writeable storage space in non-volatile memory of a storage medium for performance-enhancing functions;
redirect host-initiated write operations away from the reserved region in the non-volatile memory until a capacity condition is satisfied by data stored on the storage space outside of the reserved region; and
reallocate the reserved region in the non-volatile memory for storage of user data responsive to a determination that the capacity condition is satisfied.

2. The storage device of claim 1, wherein the processor is further configured to:
divide the useable user-writeable storage space on the storage medium into a plurality of equal sized regions, each of the regions having a size equal to the size of the reserved region.

3. The storage device of claim 1, wherein the processor is further configured to:
divide storage space on the storage medium into a plurality of regions, the plurality of regions including the reserved region.

4. The storage device of claim 3, wherein the total number of the regions is N, and the capacity condition is satisfied when N-Y regions include user data, where Y is a number between zero and N.

5. The storage device of claim 1, wherein more than one region of the user-writeable storage space is reserved for performance-enhancing functions.

6. The storage device of claim 1, wherein the region reserved for performance-enhancing functions includes a number of data bands and the storage device is a shingled magnetic recording device.

7. The storage device of claim 6, wherein granule decimation is used to isolate granules in the reserved region.

8. The storage device of claim 1, wherein the processor is further configured to:
receive a write command targeting a logical block address (LBA) range associated with the reserved region;
dynamically map an LBA range originally corresponding to physical data blocks of the reserved region to physical data blocks in another one of the regions that does not yet contain user data; and
redirect the write command to the physical data blocks in the dynamically mapped region.

9. The storage device of claim 1, wherein the processor is further configured to:
write user data to the user-writeable storage space reserved for performance-enhancing functions responsive to a determination that the capacity condition is satisfied.

10. The storage device of claim 1, wherein the capacity condition is satisfied when a total disc capacity reaches a predetermined threshold.

11. The storage device of claim 1, wherein the user-writeable storage space is divided into a plurality of regions and the capacity condition is satisfied when a number of unused regions hits a predetermined threshold.

12. The storage device of claim 1, wherein the reserved region is included in a controller-level addressing scheme that maps physical blocks of the reserved region to logical block addresses (LBAs) of a host computing device.

13. The storage device of claim 1, wherein the processor redirects the host-initiated write operations away from the reserved region by:
   temporarily excluding the reserved region from an LBA mapping scheme of a host device while the reserved region is being used for the performance-enhancing functions and not being accessed by the host device.

14. The storage device of claim 13, wherein the processor reallocates the reserved region for the storage of user data by mapping one or more LBAs of the LBA mapping scheme to the reserved region responsive to the determination that the capacity condition is satisfied.

15. A computer-readable storage medium encoding a computer program for executing computer process on a computer system, the computer process comprising:
   reserving a region of user-writeable storage space in non-volatile memory of a storage medium for performance-enhancing functions; and
   redirecting incoming host-initiated write operations away from the reserved region until a capacity condition is satisfied by data stored on the storage space outside of the reserved region in the non-volatile memory; and
   reallocating the reserved region in the non-volatile memory for storage of user data responsive to a determination that the capacity condition is satisfied.

16. The computer-readable storage medium of claim 15, further comprising:
   locating the reserved region on the user-writeable storage space based on seek time to the reserved region.

17. The computer-readable storage medium of claim 15, wherein one of the regions is a media cache floor that is not the user-writeable storage space.

18. The computer-readable storage medium of claim 15, wherein directing the host-initiated write operations away from the reserved region further comprises:
   receiving a write command targeting an LBA associated with the reserved region;
   dynamically mapping an LBA range corresponding to the reserved region to another one of the regions that does not yet contain user data; and
   redirecting the write command to the dynamically mapped region.

19. The computer-readable storage medium of claim 15, further comprising:
   cleaning data out of the reserved region responsive to a determination that the capacity condition is satisfied.

20. A processor configured to:
   divide user-writeable storage space in non-volatile memory of a storage medium into a plurality of regions;
   reserve one of the plurality of regions of the divided user-writeable storage space in the non-volatile memory for performance-enhancing functions;
   responsive to receipt of a write command targeting the reserved region, determine that a capacity condition is satisfied by data currently stored outside of the reserved region;
   reallocate the reserved region in the non-volatile memory for storage of user data responsive to a determination that the capacity condition is satisfied.

21. The processor of claim 20, wherein the plurality of regions includes N equally-sized regions, and the capacity condition is satisfied when N-Y regions include user data, where Y is a number between 0 and N.

22. The processor of claim 20, wherein the recording device is a shingled magnetic recording device and the reserved region includes a number of independently writeable granules.

* * * * *